Nov. 11, 1947.  T. WICHNER  2,430,795
DEMOUNTABLE DENTAL PIN ASSEMBLY
Filed Dec. 27, 1943

THEODORE WICHNER
INVENTOR.

BY
ATTORNEY.

Patented Nov. 11, 1947

2,430,795

UNITED STATES PATENT OFFICE 2,430,795

DEMOUNTABLE DENTAL PIN ASSEMBLY

Theodore Wichner, Los Angeles, Calif.

Application December 27, 1943, Serial No. 515,660

8 Claims. (Cl. 32—9)

This invention relates to demountable dental pins and to assemblies of replaceable tooth facing members on dentures by means of demountable pins.

One object of the invention is to provide a dental pin which is assembled from interchangeable parts and readily demountable or taken apart. Another object is to provide an assembly of a replaceable tooth facing, a demountable pin, and a denture. Still another object is to provide means for replacing broken facings on a denture without injury to the denture.

These and other objects are attained by my invention which will be understood from the following description and the accompanying drawings in which.

It is customary in the art to attach porcelain or other facings to a denture by means of pin members. The pins sometimes extend from the denture and are permanently embedded in the denture structural material, which may be cast metal or molded resinous materials. Other arrangements include pins, usually simple cylinders, permanently set in the facings, which are usually of porcelain, protruding from the facing contact surface. In this latter case the protruding end of the pin is embedded in the body of the denture either by cementing it in holes provided in the denture, or by casting or molding the protruding end of the pin in the denture material at the time of its forming.

In the event that the pin or facing breaks or cracks, it becomes necessary to replace not only the facing, but with the presently used devices, it also involves removing the pin embedded within the denture and replacing it by a new pin. The removal of the old pin and its replacement involves considerable careful work to avoid distortion of the remainder of the denture and in many instances the repaired denture is not the equal of the original in appearance or performance.

By the use of my demountable or three-piece pin, which may be readily taken apart, I overcome these difficulties.

Figure 1:
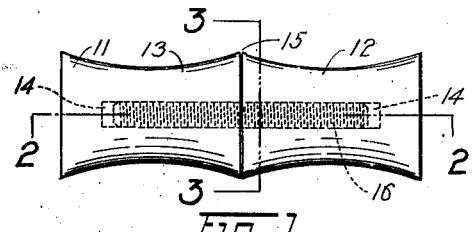
Fig. 1 is an elevation view of a demountable dental pin assembly, greatly enlarged.
Figure 2:
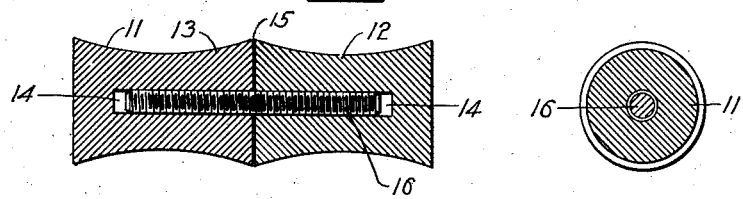
Fig. 2 is a longitudinal cross-sectional view of a demountable pin taken on the line 2—2 of Fig. 1.
Figure 3:
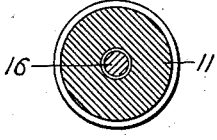
Fig. 3 is a cross-sectional view taken on the line 3—3 of Fig. 1.

Referring to the drawings, one form of my three-piece or demountable pin is shown, greatly enlarged in size, in Figs. 1, 2 and 3. The pin 11 consists of two metal anchoring members 12 and 13 which are provided with screw-threaded holes 14 extending from the contiguous faces 15, and a headless threaded metal rod 16 adapted to hold the two anchoring members together, and being somewhat less in length than the combined lengths of the holes in the anchoring members. These anchoring members 12 and 13 are shown alike, but they may be made of any suitable size, shape and surface texture, it being important that they be adapted to securely anchor the ends of the assembled pin within a cavity by means of a cementing material, or in a plastically formed or cast denture body. It is well understood that undercut cavities, irregular rather than easily drawable shaped bodies, and rough rather than smooth surfaces all tend to increase the tenacity and rigidity of the anchorage. For simplicity I have shown the anchoring members 12 and 13 as being circular (Fig. 3) or square (Figs. 5 and 6) in cross-section, with diameter and sides, respectively, decreasing to a minimum intermediate the ends of the pieces, these shapes tending to improve the resistance to withdrawal of the pin; other shapes favoring secure anchorage may also be employed.

Figure 4:
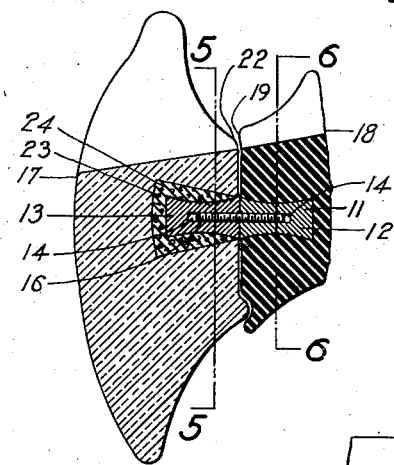
Fig. 4 is an elevation, partly in section, showing an assembly of my demountable pin, a tooth facing and a portion of a denture.
Figure 5:
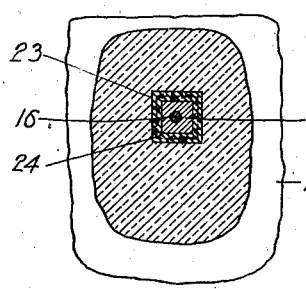
Fig. 5 is a cross-sectional view taken on the line 5—5 of Fig. 4.
Figure 6:
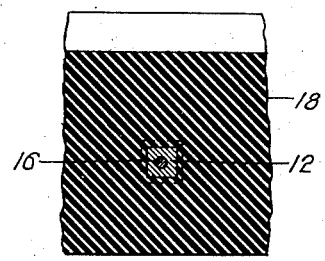
Fig. 6 is a cross-sectional view taken on the line 6—6 of Fig. 4.

In Figs. 4, 5 and 6 is shown an assembly of my demountable pin 11, a tooth facing 17, and a denture portion 18. The denture may be a full or partial plate, and may be made of plastic material or of metal. One of the metal anchoring members 12 is embedded with its contiguous face 15 flush with the contact surface 19, within the structure of the denture 18, at the time it is originally made, by procedures well known to the dental profession. The porcelain facing 17 is provided with a rear contact surface 22 contiguous with the surface 19 of the denture 18, and an undercut cavity 23 is provided adjacent the embedded anchoring member 12, and having an opening in the contact surface 22 large enough to receive the other anchoring member 13, which is assembled with the embedded anchoring member 12 by the threaded rod 16. The facing member 17 is securely fastened to the three-piece demountable pin 11 by means of cement, represented at 24, which is put into the cavity 23 and the anchoring member 13, threaded on the rod 16 and with the contiguous faces 15 in contact, is pressed into the cavity and held until the cement has set. The cement may be any suitable dental cement.

If it becomes necessary to replace the facing 17, it is only necessary to break off the porcelain, remove the anchoring member 13 by unscrewing it from the rod 16 to clean it free from adhering cement, and then to replace the facing with a new unit, using the cleaned-up original anchoring member 13 if usable, or by screwing a new one on the rod 16. In the event that the threaded rod 16 has been injured or broken off, with some of it protruding from the anchoring member 12 beyond the contiguous surface 19 of the denture, it may be unscrewed and replaced by a new interchangeable rod; if broken off flush with the surface 19, it may be drilled and tapped, or grooved in the end, and removed by suitable tools, and then replaced with another similar rod screwed into the threaded anchoring member 12 which is permanently embedded in the body of the denture.

It will be seen that replacements of facings on a denture may be quickly and easily made when my demountable or three-piece pin unit constitutes the joining means, whether the injury is in the facing or in the pin. Any shaped tooth facing as desired may, of course, be used in assemblies including my pin invention.

While preferred embodiments of my invention have been described and shown, I do not wish to be restricted to these particular forms, but limit my invention only insofar as required by the state of the art and the spirit of the appended claims.

I claim:

1. A demountable dental pin consisting of a headless rod threaded from end to end, and two non-drawable anchoring members having threaded holes adapted to fit on said rod said threaded rod being completely enclosed by the said two anchoring members and inaccessible when said pin is in assembled condition.

2. A demountable dental pin comprising a headless rod threaded from end to end, and two non-drawable anchoring members having contiguous faces, each having a threaded hole opening from a contiguous face and adapted to be held together by the threads of said threaded rod said threaded rod being completely enclosed by the said two anchoring members and inaccessible when said pin is in assembled condition.

3. A demountable dental pin consisting of a headless rod threaded from end to end, and two threaded-holed metallic non-drawable anchoring members held in face-to-face relation on said rod, said threaded rod being completely enclosed by the said two anchoring members and inaccessible when said pin is in assembled condition, said members being adapted to be rigidly anchored within portions of a complete denture.

4. A demountable dental pin consisting of a headless rod threaded from end to end, and two threaded-holed non-drawable anchoring members held in face-to-face relation on said rod, said threaded rod being completely enclosed by the two anchoring members and inaccessible when said pin is in assembled condition, one of said members being adapted to be rigidly embedded in a denture structure and the other member being adapted to be rigidly held by cement in a cavity in a facing unit for said denture.

5. A demountable dental pin consisting of a headless rod threaded from end to end, and two threaded-holed non-drawable anchoring members held in face-to-face relation on said rod, said threaded rod being completely enclosed by the two anchoring members and inaccessible when said pin is in assembled condition, each of said members having a body shape adapted to resist withdrawal from a rigid embedding material in a cavity.

6. In a dental assembly, a demountable dental pin consisting of a headless rod threaded from end to end and two contiguous faced non-drawable anchoring members, said threaded rod being completely enclosed by the two anchoring members and inaccessible when said pin is in assembled condition, a denture within the body of which one of said members is embedded, and a tooth-facing attached to said denture by the other of said anchoring members, the said facing having a cavity on its back side into which said other anchoring member is rigidly cemented.

7. In a dental assembly, a denture, a tooth-facing having a cavity in its back surface portion, and a demountable three-piece dental pin rigidly holding said facing on said denture, said pin consisting of a threaded-holed non-drawable anchoring member rigidly embedded within the structure of said denture and having a surface contiguous to a back surface of said tooth-facing, a second threaded-holed anchoring member protruding into the cavity of said tooth-facing and having a surface contiguous to said denture surface, cementing material rigidly embedding said second anchoring member in said cavity, and a headless rod threaded from end to end holding said anchoring members in face to face relation said threaded rod being completely enclosed by the two anchoring members and inaccessible when said pin is in assembled condition.

8. In a dental assembly, a denture having a theaded-holed non-drawable anchoring member rigidly embedded therein, a tooth-facing having a cavity on its back side with a second threaded-holed non-drawable anchoring member rigidly cemented in said cavity, and a headless rod threaded from end to end holding said tooth-facing on said denture by means of said anchoring members threaded thereon said threaded rod being completely enclosed by the two anchoring members and inaccessible when said pin is in assembled condition.

THEODORE WICHNER.

REFERENCES CITED

The following references are of record in the file of this patent:

UNITED STATES PATENTS

| Number | Name | Date |
| --- | --- | --- |
| 1,345,595 | Highkin | July 6, 1920 |
| 1,507,231 | Cressler | Sept. 2, 1924 |
| 1,633,241 | Burlew | June 21, 1927 |

FOREIGN PATENTS

| Number | Country | Date |
| --- | --- | --- |
| 146,301 | Great Britain | July 2, 1920 |
| 6,565 | Australia | Mar. 23, 1927 |
| 310,123 | Italy | July 28, 1933 |